United States Patent [19]
Cox et al.

[11] Patent Number: 5,890,130
[45] Date of Patent: Mar. 30, 1999

[54] WORKFLOW MODELLING SYSTEM

[75] Inventors: Norman Lloyd Cox, Colleyville, Tex.; Allan Lee Scherr, Weston, Conn.; Kathleen Marie Snyder, Cos Cob, Conn.

[73] Assignee: International Business Machines Corporation, Armonk, N.Y.

[21] Appl. No.: 493,140

[22] Filed: Jun. 21, 1995

Related U.S. Application Data

[62] Division of Ser. No. 192,394, Feb. 4, 1994.

[51] Int. Cl.$^6$ ..................................................... G06F 17/60
[52] U.S. Cl. ................................. 705/7; 705/28; 345/440
[58] Field of Search .................................. 705/1, 7, 8, 9, 705/28, 29; 345/440, 133, 140

[56] References Cited

U.S. PATENT DOCUMENTS

| | | | |
|---|---|---|---|
| 4,292,623 | 9/1981 | Eswaran et al. | 340/825.5 |
| 4,800,510 | 1/1989 | Vinberg et al. | 345/440 |
| 5,452,409 | 9/1995 | Smith | 345/440 |
| 5,581,677 | 12/1996 | Myers et al. | 345/440 |
| 5,611,034 | 3/1997 | Makita | 345/440 |
| 5,630,069 | 5/1997 | Flores et al. | 705/7 |

OTHER PUBLICATIONS

A.L. Scherr: "A New Approach to Business Processes", *IBM Systems Journal*, vol. 32, No. 1, pp. 80–98, May 11, 1993.

*Primary Examiner*—Joseph Thomas
*Attorney, Agent, or Firm*—Arthur J. Samodovitz

[57] ABSTRACT

A system generates a model of a workflow. The system begins by displaying on a computer screen a first flowgraph between two horizontal time lines representing two respective participants. The first flowgraph comprises a plurality of vertical directional line segments extending between the two horizontal time lines and representing respective communications or other actions between the participants. Next, the computer receives a selection of a second flowgraph for display between one of the two time lines and a third, horizontal time line representing a third participant. The second flowgraph comprises a plurality of vertical directional line segments extending between the one time line and the third horizontal time line and representing respective communications or other actions between the participants represented by the one and third time lines. Then, the computer displays the second flowgraph between the one and third time lines. The computer also generates a verbal description of communications or other actions represented by vertical line segments that lead to or from each time line.

29 Claims, 15 Drawing Sheets

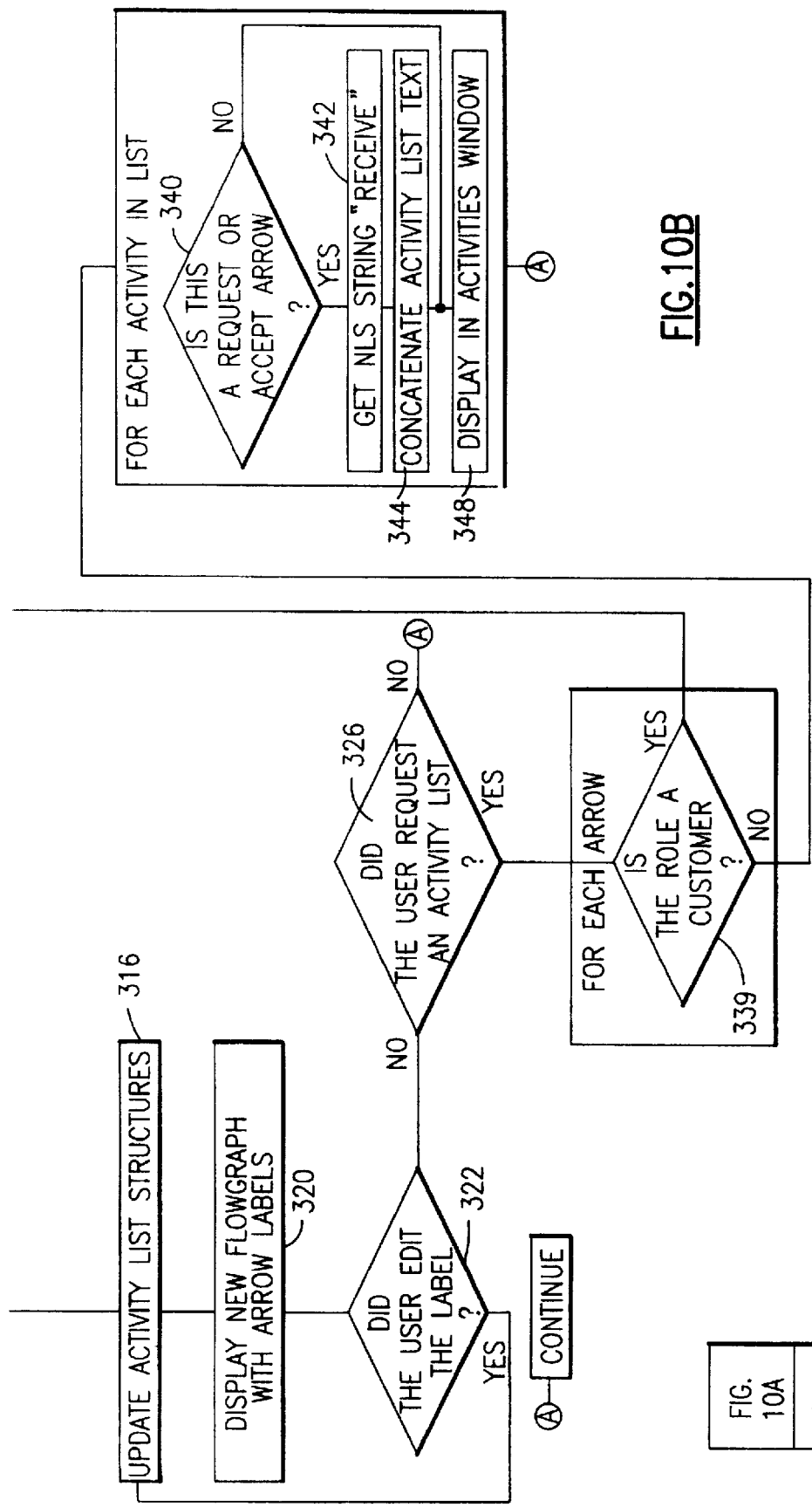

SALES PROCESS - ACTIVITY LIST

ACTIVITY  SELECTED  EDIT  VIEW  OPTIONS  WINDOWS  HELP

ROLE: CREDIT BUREAU

| WORKFLOW | ACTIVITY |
|---|---|
| CREDIT CHECK | [+] RECEIVE REQUEST FOR CREDIT CHECK FROM ACCOUNTING |
| | [+] AGREE TO REQUEST FOR CREDIT CHECK FROM ACCOUNTING |
| | [+] REPORT COMPLETION OF REQUEST FOR CREDIT CHECK TO ACCOUNTING |
| | [+] RECEIVE ACCEPTANCE OF CREDIT CHECK REPORT FROM ACCOUNTING |

FIG.13

WORKFLOW MODELLING SYSTEM

This is a division of Ser. No. 08/192,394, filed on Feb. 4, 1994.

BACKGROUND OF THE INVENTION

The invention relates generally to computer systems, and deals more particularly with computer modelling of communications and other actions in a business workflow.

During the course of running a business, there may be many steps and people involved in each sale of goods or services. For example, initially the customer makes an order and requests credit. Then, a salesperson makes a preliminary determination if the company can meet the request and if so, passes the credit request to an accounting department. The accounting department requests a credit report from a credit bureau. If the credit bureau responds with a favorable credit report, the accounting department notifies the salesperson that credit is approved. Then, the salesperson asks the production department for pricing, delivery and other terms. The production department checks with a supplier and responds to the salesperson. Next, the salesperson responds to the customer with the pricing, delivery and other terms. Assuming, all terms are acceptable, the salesperson notifies the production department to actually fill the order. Then a shipping department delivers the goods. Finally, the customer pays the bill according to the previously established terms. If the business sells a service instead of goods, then a similarly complex workflow may be required. Thus, there are many steps and people involved in satisfying one order for goods or services and all steps must be performed to satisfy the order. In the past, problems have occurred because one or more people involved in the order forgot or did not understand their responsibility. For example; if the salesperson forgot to notify the production department after receiving the approval from accounting, then the order may not have been filled.

An object of the present invention is to provide a computer system for modelling a business workflow.

Another object of the present invention is to provide such a computer system which clearly specifies the responsibilities of each participant.

SUMMARY OF THE INVENTION

The invention resides in a system and computer implemented method for generating a model of a workflow. The method begins by displaying on a computer screen a first flowgraph between two horizontal time lines representing two respective participants. The first flowgraph comprises a plurality of vertical directional line segments extending between the two horizontal time lines and representing respective communications or other actions between the participants. Next, the computer receives a selection of a second flowgraph for display between one of the two time lines and a third, horizontal time line representing a third participant. The second flowgraph comprises a plurality of vertical directional line segments extending between the one time line and the third horizontal time line and representing respective communications or other actions between the participants represented by the one and third time lines. Then, the computer displays the second flowgraph between the one and third time lines.

According to one feature of the invention, the one and third time lines represent a customer participant and a supplier participant. The second flowgraph comprises a first arrow pointing from the customer time line to the supplier time line representing a request for goods or services, a subsequent arrow pointing from the supplier time line to the customer time line representing agreement to provide the goods or services, a subsequent arrow pointing from the supplier time line to the customer time line representing performance, and a subsequent arrow pointing from the customer time line to the supplier time line representing payment or acceptance of the goods or services.

According to another feature of the invention, the computer generates a verbal description of communications or other actions represented by vertical line segments that lead to or from each time line.

BRIEF DESCRIPTION OF THE FIGURES

FIGS. 10A and 10B are flowcharts illustrating a computer process for determining default arrow labels and the verbal descriptions of a detailed workflow model generated according to FIGS. 7–9.

FIG. 13 illustrates a computer screen, generated by the computer of FIG. 1, displaying a verbal description of the communications between an accounting department and credit bureau, from the credit bureau's perspective, in the business workflow of FIG. 5.

DETAILED DESCRIPTION OF THE PREFERRED EMBODIMENTS

Figure 1:
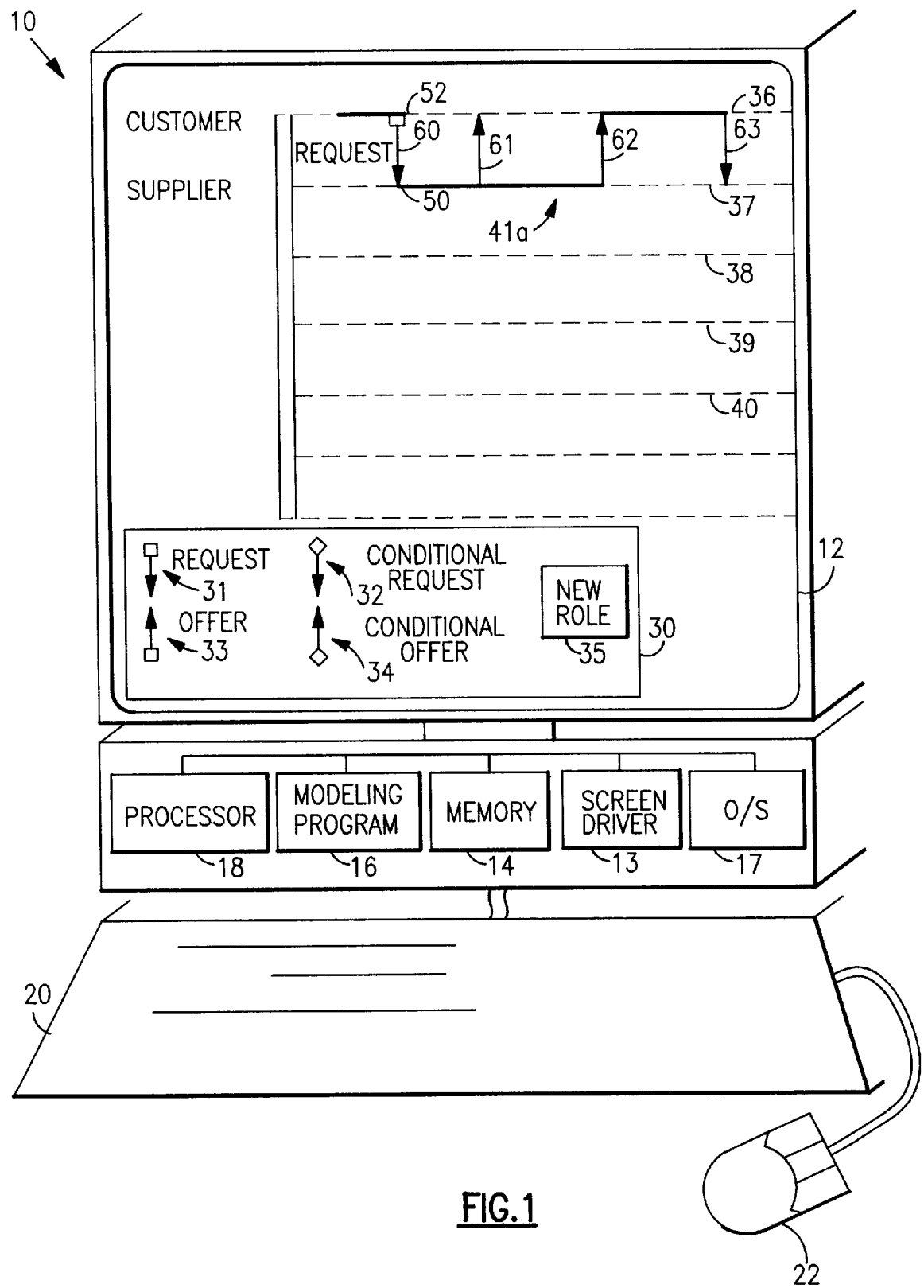
FIG. 1 illustrates a computer which displays a set of background time lines and a set of predefined icons used to model a business workflow according to the present invention.

Referring now to the drawings in detail wherein like reference numbers indicate like elements or steps throughout the several drawings, FIG. 1 illustrates a computer system generally designated 10 which is programmed according to the present invention. Computer 10 comprises a display screen 12, a screen driver 13, a memory 14 storing a workflow modelling computer program 16 (in object code form) and resultant modelling data, an operating system 17, a processor 18 which executes program 16 and operating system 17, and a keyboard 20 with a selection mouse 22. By way of example, the computer 10 is an IBM PS/2 personal computer with an IBM OS/2 operating system and the screen driver 13 is an IBM Presentation Manager program within the IBM OS/2 operating system. The Presentation Manager program is described in detail in "OS/2 Technical Library—Presentation Manager Program Reference volumes 1–3" which is available from IBM at Mechanicsburg, Pa. by order #s S10G-6264-00, S10G-6265-00 and S10G-6272-00. These documents are hereby incorporated by reference as part of the present patent application.

FIG. 1 also illustrates that system 10 automatically (and initially) displays a set 30 of predefined icons 31–35, flowgraph 41a, background time lines 36–40, generic "request" arrow label and generic "customer" and "supplier" time line labels. Time advances from left to right. Flowgraph 41a comprises four arrows 60–64 which represent four respective communications or other actions between the customer and supplier. The terms "customer" and "supplier" are generic because any participant making any type of request can be viewed as a customer and any participant fulfilling the request can be viewed as a supplier. Each arrow originates from the source of the communcation or action. Typically, the first arrow 60 represents a request for a product or service, the second arrow 61 represents an agreement to fulfil the request, the third arrow 62 represents a report that the request has been fulfilled (or actual supply of the goods or services) and the fourth arrow 63 represents acceptance of the goods or services by the requestor (or actual payment for the goods or services if payment is required).

Each of the flowgraphs also comprises several horizontal line segments which interconnect the vertical arrows and indicate the existence of a conversation or other active relationship between the two departments. (The customer is also considered a department.) There are two types of horizontal line segments in each of the flowgraphs and a third type of horizontal line forms each time line. Each solid, horizontal line segment of a flowgraph such as line segment 50 indicates that a conversation or other active relationship involving the respective department is currently in progress and the respective department (i.e. the supplier in this example) is the one obligated to initiate the next communication or perform the next action. This next communication or next action is the one represented by arrow 61. Each broken, horizontal line segment of a flowgraph such as line segment 52 indicates that a conversation or other active relationship involving the respective department is currently in progress but the respective department is not the one obligated to initiate the next communication or perform the next action. In the example of FIG. 1, line segment 52 corresponds to the customer. Thus, for any one flowgraph between two departments, for every solid line segment of one department there is a broken line segment for the other department during the same time period. The solid line was chosen to indicate the department which is obligated to initiate the next communication or take the next action because the solid line segment is bolder than the broken line. The time line that existed before introduction of the flowgraphs and those portions not subsequently overwritten with either a solid horizontal line segment or a broken horizontal line segment of a flow graph indicate that no conversation or other active relationship involving the respective departments is currently in progress.

Figure 5:
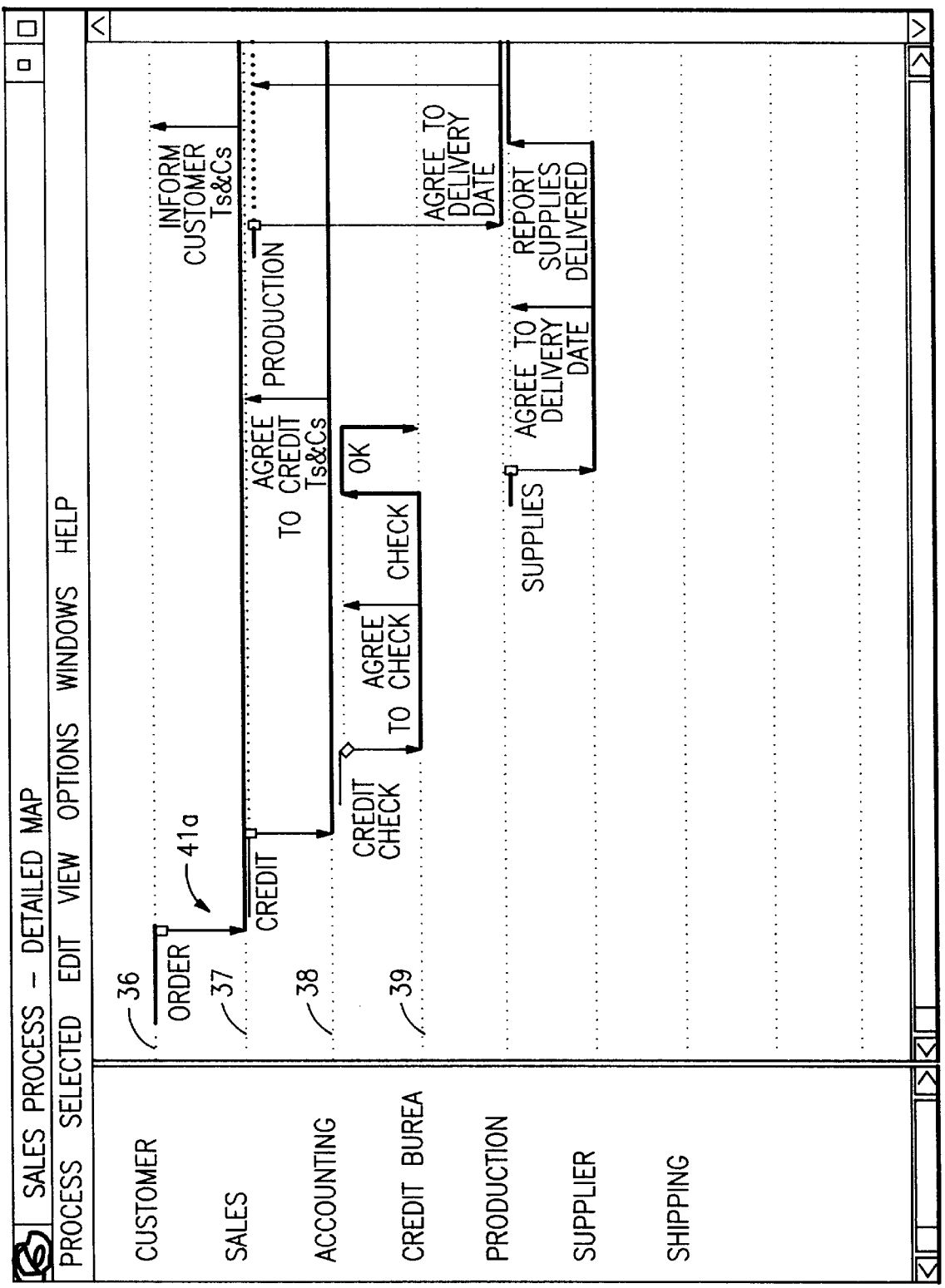
FIG. 5 illustrates a computer display of a portion of a detailed business workflow model resulting after any of the modelling processes of FIGS. 1–4.

Next, the operator can proceed to overwrite any of the predetermined, default labels, using the cursor and keyboard, to tailor the flowgraph to the particular structure of the company providing the goods or services. Next, the operator can label the other arrows using the cursor and keyboard. The operator can use the mouse to drag any or all of the vertical arrows left or right as needed to make room for the labels or coordinate in time with subsequently selected flowgraphs between other pairs of time lines. FIG. 5 illustrates a beginning portion of a complex workflow model which includes the first half of flowgraph 41a; the second arrow of flowgraph 41a being moved well to the right. Thus, the first level of the workflow has now been modelled.

Figure 2:
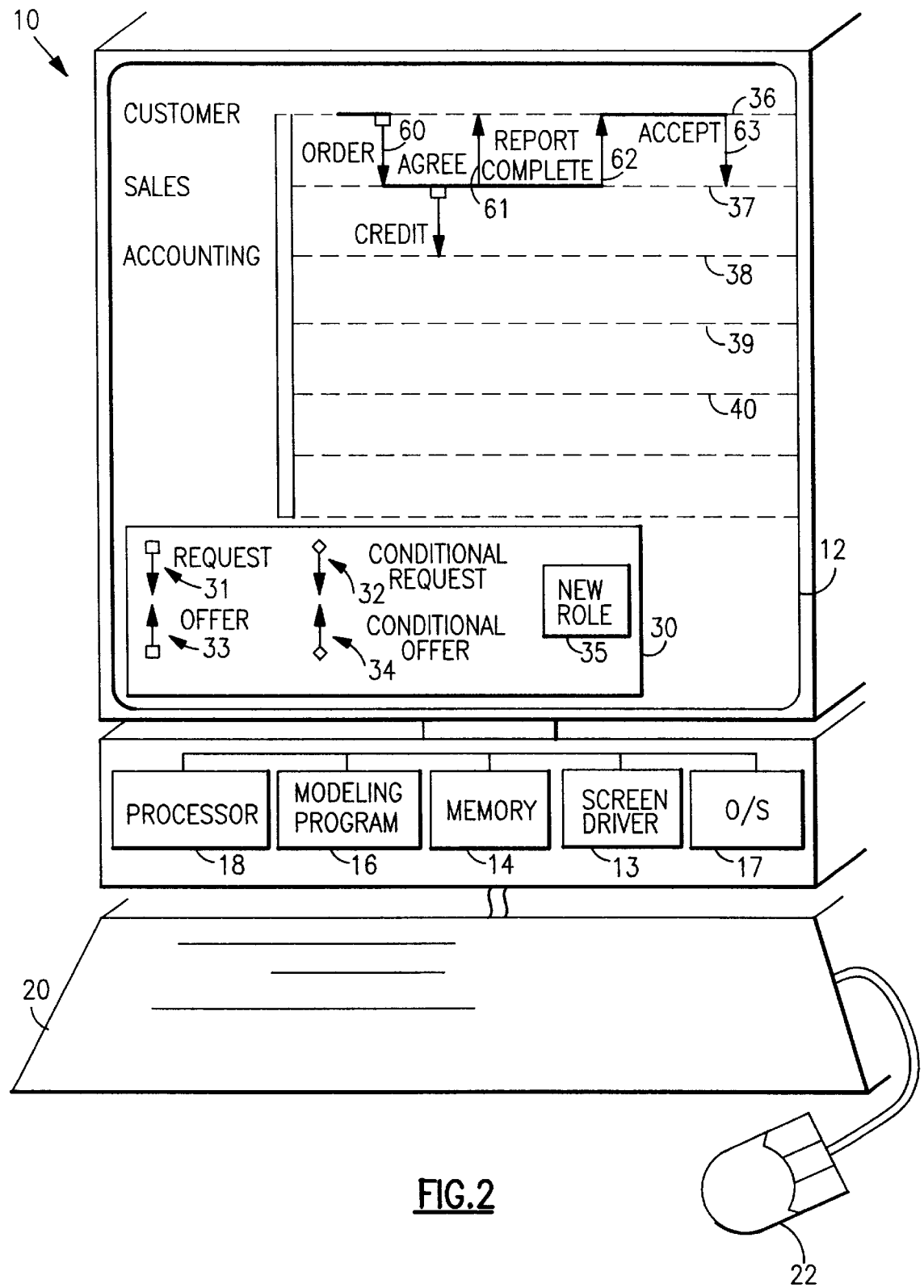
FIG. 2 illustrates the computer display of FIG. 1 after a few steps in the modelling process.
Figure 3:
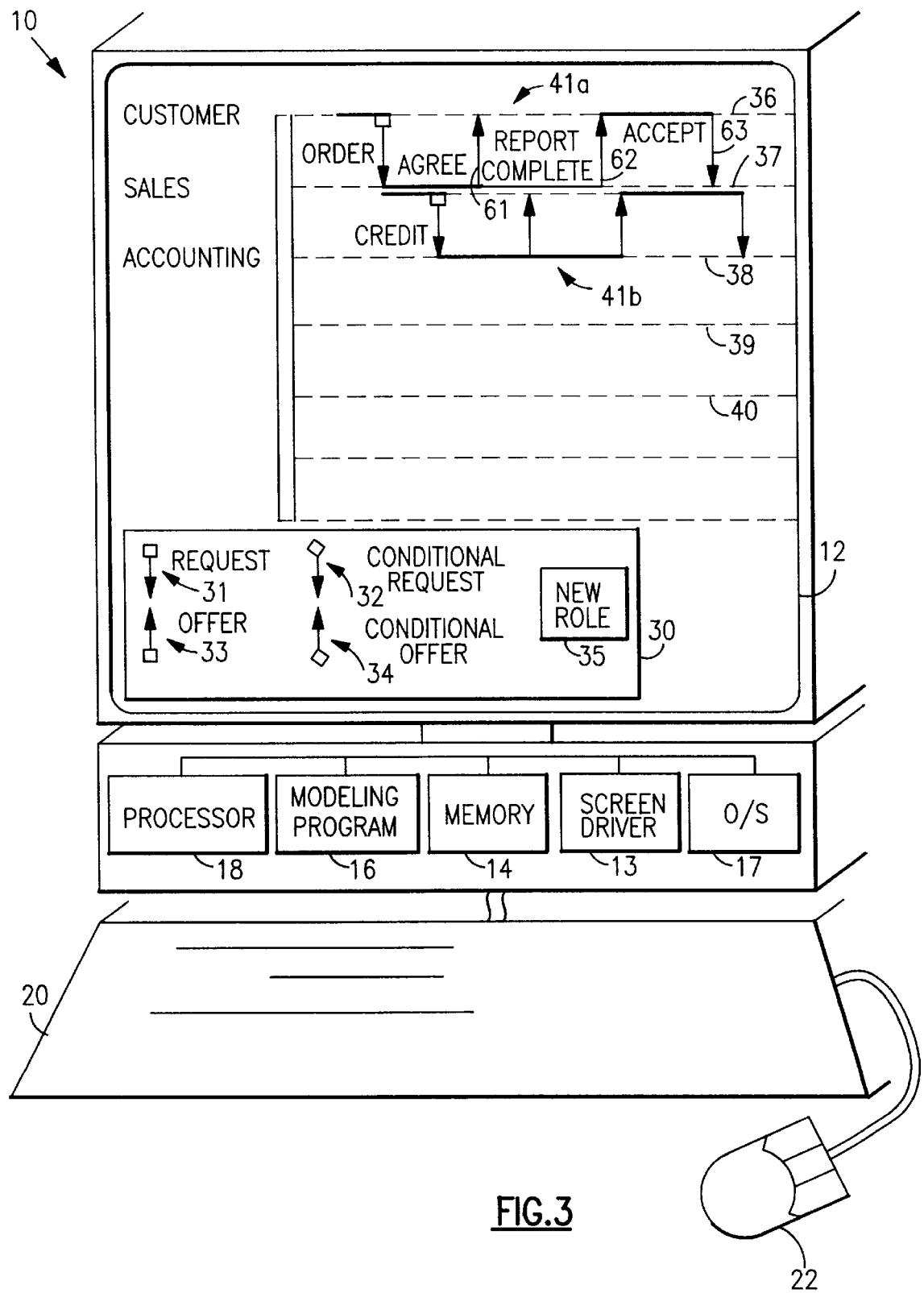
FIG. 3 illustrates the computer display of FIG. 2 after another step in the modelling process in which an icon of FIG. 1 has been expanded into a corresponding flowgraph.

Next, the icons and other time lines can be used as follows to model additional levels of the business workflow. An operator labels time line 38 to represent another department or person responsible for the communications or other tasks in the next level of the business workflow. The labeling is performed by dragging a "new role" icon 35 to a position adjacent to the beginning of time line 38 using mouse 22 and then typing the desired label. The general process of selecting and dragging an icon using a mouse and screen driver software is well known in the art and need not be discussed further. FIG. 2 illustrates that an "accounting" label has been so entered for time line 38 (and the fact that the operator previously overwrote the supplier label as "sales" and the request label as "order" and entered other arrow labels). Then, the operator selects one of the icons such as request icon 31 and drags a copy of it in a vertical orientation between time lines 37 and 38 using the mouse 22 and drops it there. Next, the operator can overwrite the request icon label with a more specific description of the communication or other action. The positioned icon and resultant "credit" label are also illustrated in FIG. 2. Next, using the mouse, the operator double clicks on the enclosed portion of the positioned icon to cause it to expand into a corresponding flow graph 41b as illustrated in FIG. 3. (Each of the other icons 32–34 is also expandable into a respective flowgraph 42–44 illustrated in FIG. 4.) The modelling program 16 implements the expansion by fetching a predefined file which defines all pixels for the four arrows and horizontal line segments that correspond to the icon 31. These pixels are positioned between the two time lines 37 and 38. The upper horizontal line segments of flow graph 41b are positioned slightly beneath the time line 37 and lower horizontal line segments of the flowgraph 41a to distinguish the upper horizontal line segments of the flowgraph 41b from the lower horizontal line segments of flowgraph 41a and indicate that the sales department represented by timeline 37 is concurrently a participant in two conversations. Then, the operator labels each arrow of the second flowgraph 41b with a description of the communication or other action by double clicking with the mouse on the desired arrow and typing a label in the space provided. The operator can drag any or all of the vertical arrows of flowgraphs 41a or 41b left or right as needed to make room for the labels or coordinate in time with each other or subsequently selected flowgraphs between other pairs of time lines. The foregoing process is repeated until the entire business workflow is modeled in accordance with one object of the present invention. The order that the operator labels the time lines and arrows and drags the arrows left or right is not critical to the present invention.

Figure 4:
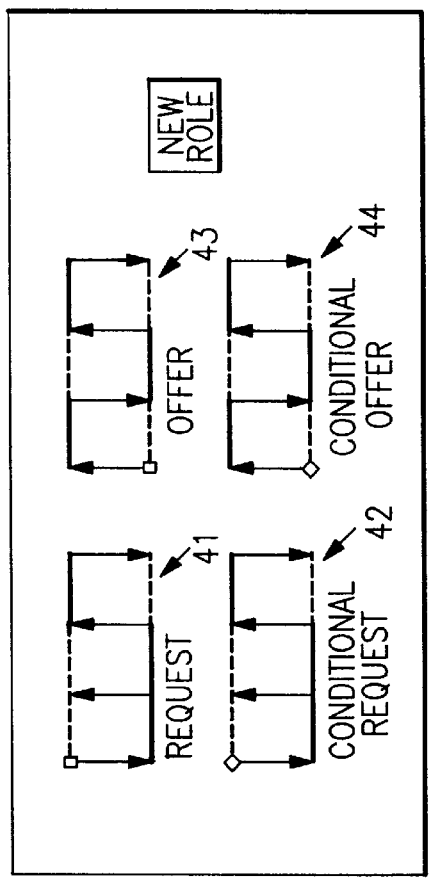
FIG. 4 illustrates an alternate set of predefined flowgraphs which can initially be used to model the business workflow instead of the icons of FIG. 1.

In an alternate embodiment of the present invention, the flowgraphs 41–44 of FIG. 4 are initially displayed on screen 12 of FIG. 1 for use in modelling the additional levels instead of icons 31–34 and are selected and dragged to a position between the appropriate time lines using the mouse. In this alternate embodiment, there is no need to expand the flowgraphs 41–44 after being positioned, and the result is the same as the icons 31–34 after expansion. (If desired the flowgraphs 41–44, when initially displayed, can omit the broken horizontal line segments, and system 10 can display the broken horizontal line segments when the flowgraphs are positioned between two of the time lines.) The arrows of the flowgraphs in this alternate embodiment are then labeled in the manner described above.

Figure 6:
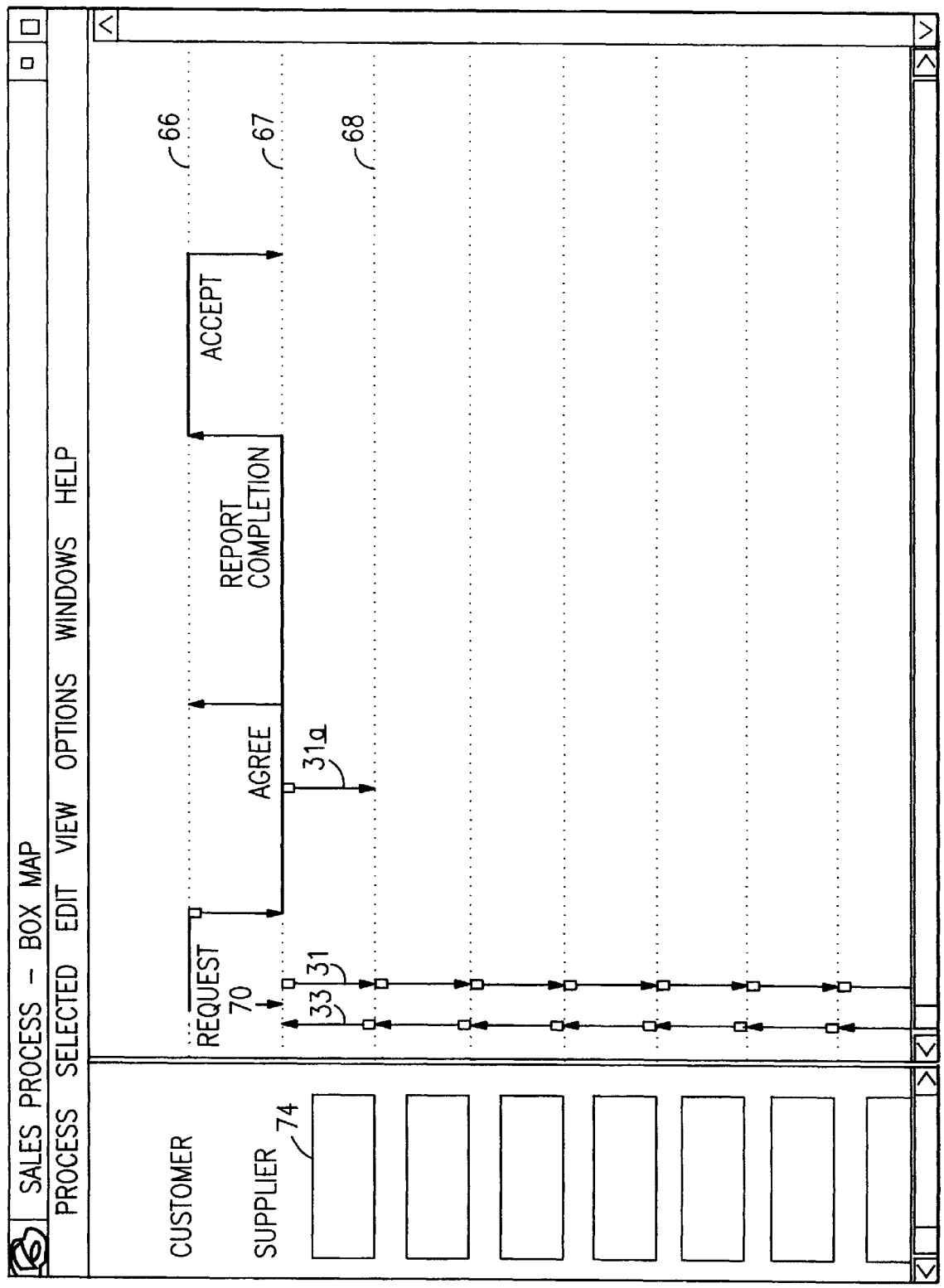
FIG. 6 illustrates an alternate screen display used for modelling the business workflow.

FIG. 6 illustrates an alternate technique for modelling the business workflow. Everything illustrated in FIG. 6 appears at the start of modelling (before any selections are made) except for icon 31a. Thus, at the start of modelling, the flowgraph for a request is preset between time lines 66 and 67, and the generic "customer" and "supplier" labels are preset. The operator can drag any of the vertical arrows left or right to make room for the labels or coordinate in time with subsequently selected flowgraphs. Then, to bring other flowgraphs into the model, the operator drags a copy of one of the icons represented collectively as 70 at the beginning of each time line rightward to the appropriate position as illustrated by icon 31a. Then, the operator expands the icon 31a by double clicking on the closed portion of icon 31a. The expanded form is identical to the flowgraph 41. (The expanded form of icon 33 is flowgraph 43.) Next, the operator can label the time line 68 by selecting a box icon 74 and typing in the appropriate label. Next, the operator can label the vertical arrows of the newly selected flowgraph in the manner described above. This process is repeated until the entire business workflow is modelled in accordance with the object of the present invention.

Much of the final workflow model generated by any of the procedures described above is illustrated in FIG. 5. It should be noted that for some flowgraphs, one or more of the vertical lines such as vertical lines 80 and 82 must be elongated to indicate communication or other action between two departments represented by nonadjacent time lines. During modelling, the flowgraph is initially formed between two adjacent time lines in the manner noted above. Then the arrows are elongated by single clicking on the leading arrow of the flow graph or the single arrow of an icon and then dragging the mouse up or down until the arrow extends to the proper source or destination. Data defining the workflow model of FIG. 5 is stored as a file in memory 14.

Figure 7:
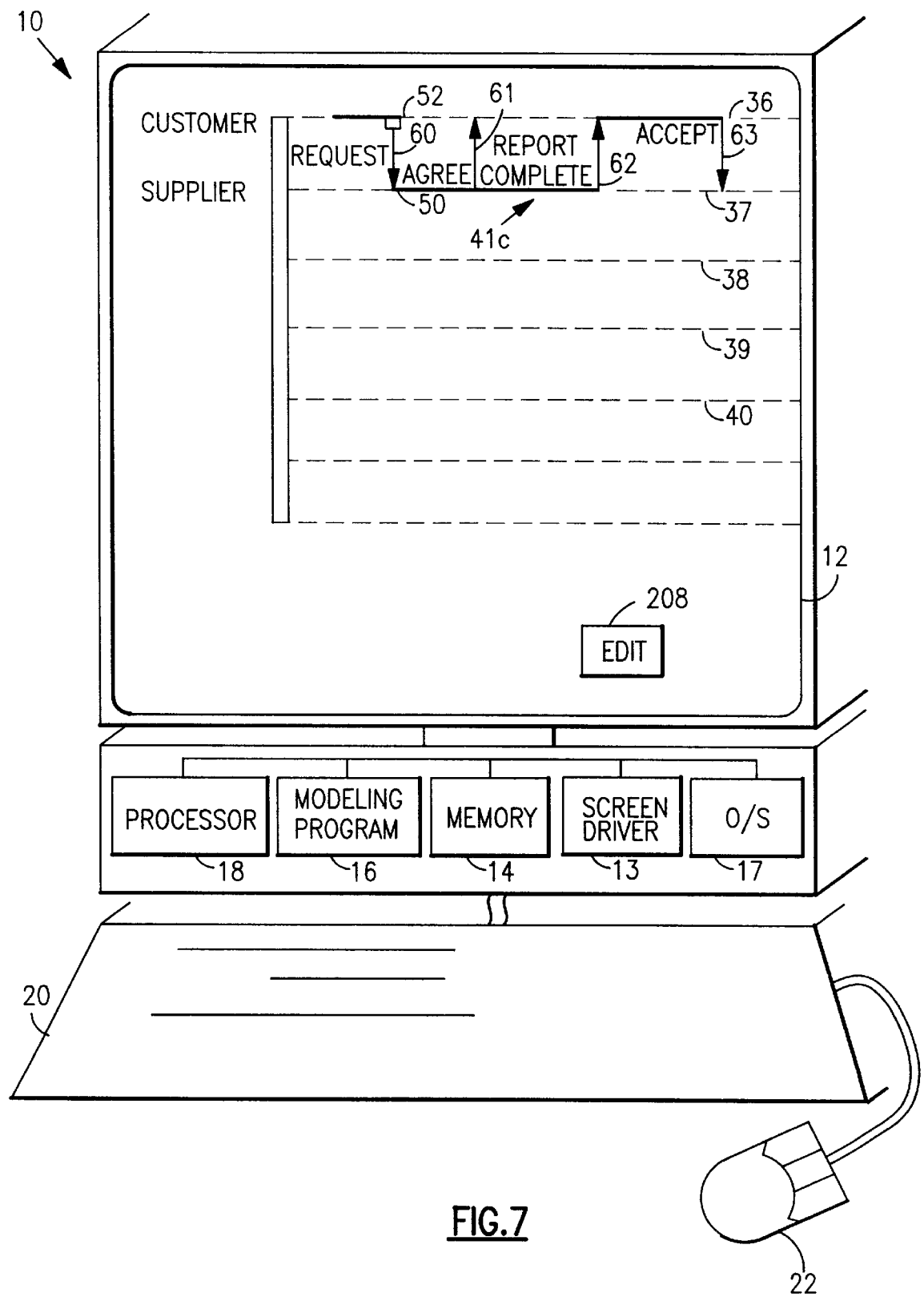
FIG. 7 illustrates an alternate screen display used for modelling the business workflow.

FIG. 7 illustrates computer system 10 with a different embodiment of the modelling program. System 10 automatically (and initially) displays the screen of FIG. 7 including flowgraph 41c without data input from the user. As noted above, the terms "customer" and "supplier" are generic; any participant making any type of request can be viewed as a "customer" and any participant fulfilling the request can be viewed as a "supplier". The operator can change any of the time line labels by clicking on them with the mouse and then typing over them using the keyboard. System 10 also automatically displays "request", "agree", "report completion" and "accept" default labels for the four arrows of the flowgraph. The user can change any of the arrow labels by clicking on them and then typing over them with the keyboard.

Figure 8:
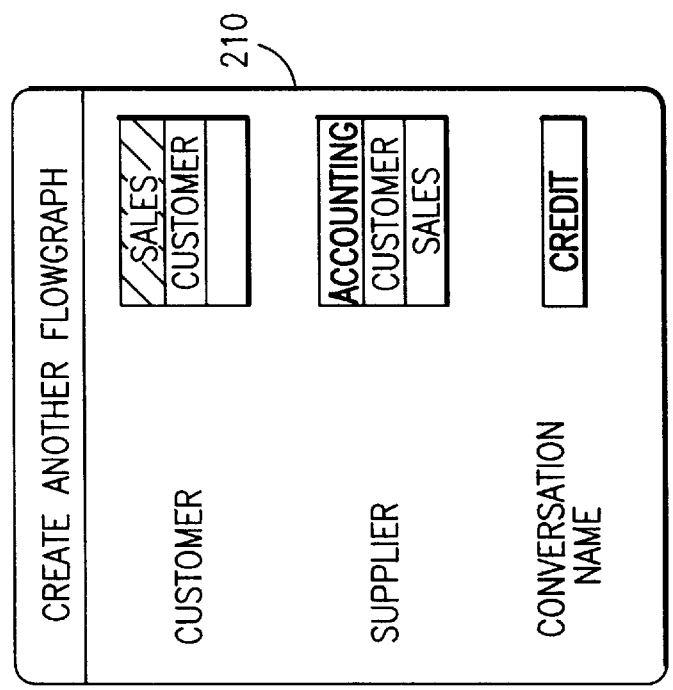
FIG. 8 illustrates a subsequent screen display for the modelling process of FIG. 7.

Next, the user selects an "edit" button 208 and then a "create another flowgraph" choice which supplants the edit button. After selecting the "create another flowgraph" choice, system 10 displays a screen 210 of FIG. 8. From screen 210, the operator selects a time line label of "sales" as the customer, enters a time line label of "accounting" as the supplier, and enters a type of the flowgraph such as "credit". In response, system 10 displays a screen 220 of FIG. 9 in which a new flowgraph 41d is positioned one level below and slightly to the right of the flowgraph 41c of FIG. 7. The positioning is such because the generic customer for the new flowgraph is the same as the operator entered label for time line 37 of FIG. 7, the generic supplier for the new flowgraph does not match either of the labels for time lines 36 or 37 and the second request will necessarily occur some time after the first request. The "accounting" label for time line 38 is taken directly from the selections of FIG. 8. The user can add more flowgraphs in the manner noted above with each new participant labeled on the next available, lower time line. However, if the user designates two existing participants whose time lines are not adjacent, or one new participant and a previous participant other than the last one defined, then the resultant arrows will traverse any intervening time lines. Also, if the supplier's name was previously used and the customer's name was not previously used, then the customer's name will be the label for the next available, lower time line and the directions of the arrows of the flowgraph will be reversed. FIG. 5 illustrates two noninverted, but elongated arrows representing communications or other actions between the sales and productions departments.

Figure 9:
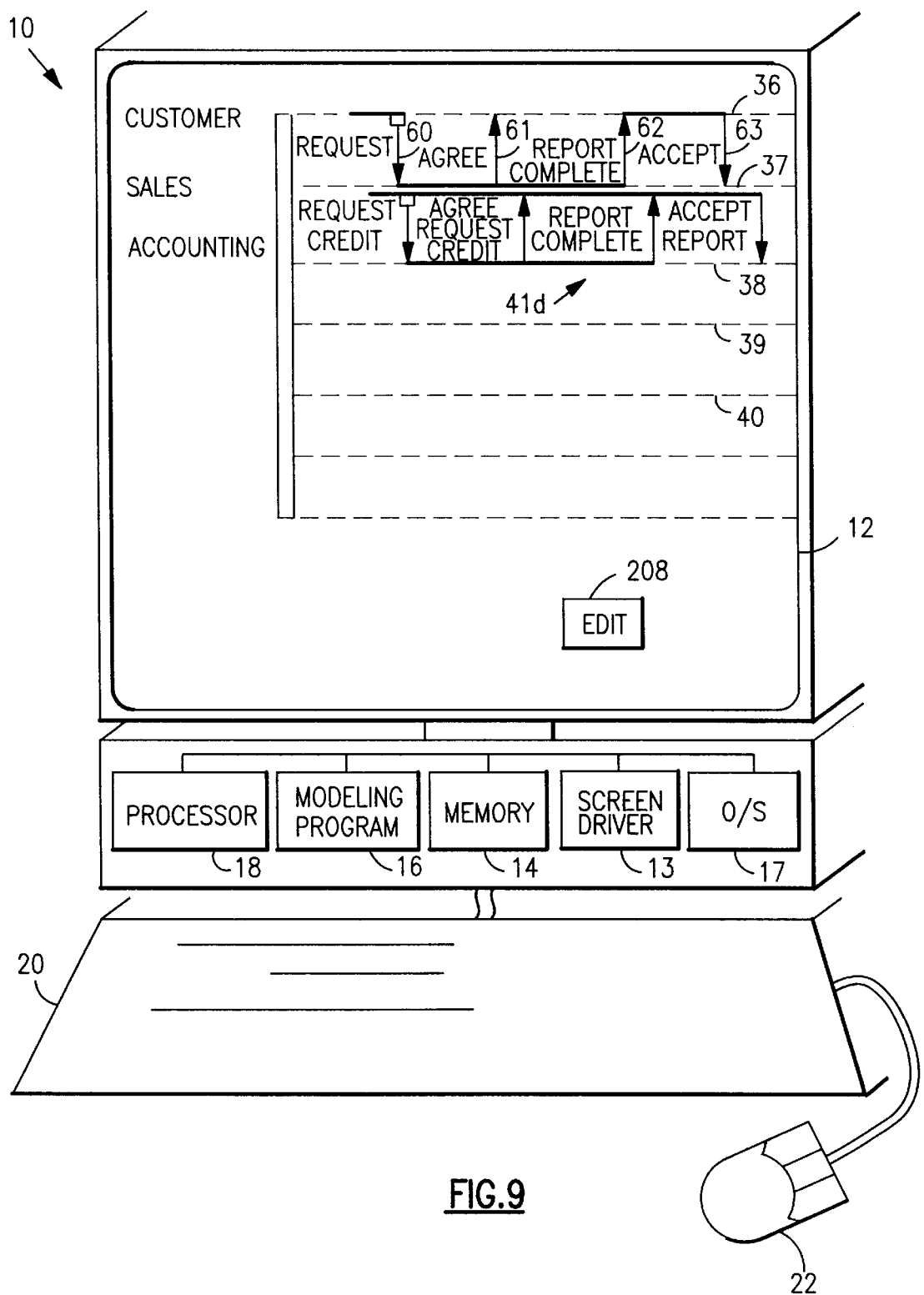
FIG. 9 illustrates a subsequent screen display for the modelling process of FIG. 8.
Figure 10A:
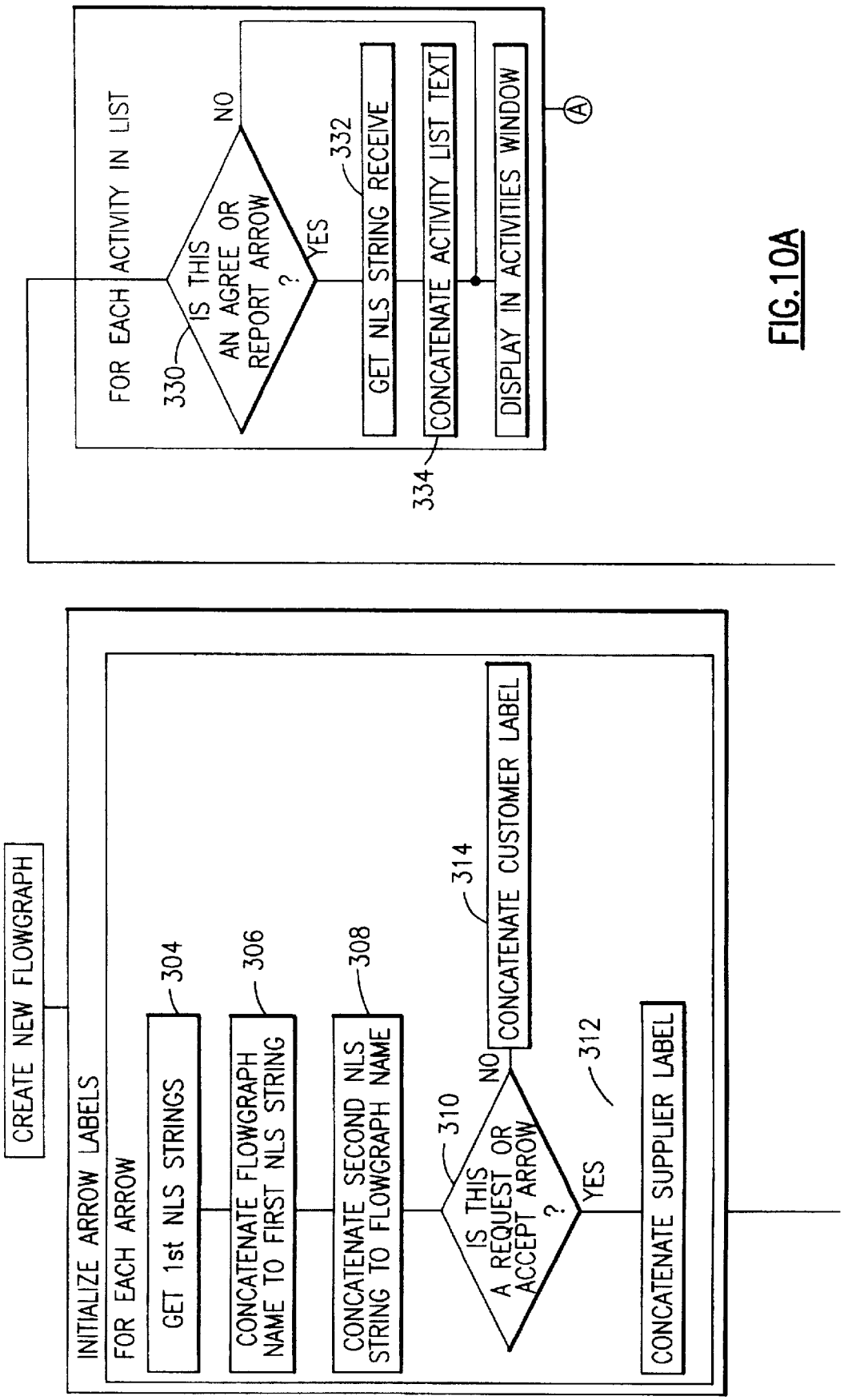

After each new flowgraph is created and the new time line(s) defined using screens 210 and 220 as described above, program 16 generates default arrow labels as shown in FIG. 9 in the manner illustrated in FIG. 10. For flowgraph 41, there are four generic types of arrows—request a product or service from a supplier, agree to the request from customer, report completion of the requested goods or services to the customer, and accept the goods or services from supplier. These four are illustrated in Table I:

TABLE I

| | Arrow Type | Product/ Service | | Role | |
|---|---|---|---|---|---|
| 1. | Request | | From | | |
| 2. | Agree to | | From | | |
| 3. | Report Completion of | | To | | |
| 4. | Accept | | From | | |

Each default label includes two standard national language support (NLS) text strings in the same row as indicated by the entries in the first and third columns. Each complete default label also includes information for the blanks in the second and fourth columns. The system automatically fetches the first of two NLS text strings that correspond to the type of arrow (step 304). For the first arrow of a "request" flowgraph, the first text string is "Request" (and the second text string is "from"). To further assemble an arrow label, program 16 concatenates the information for the respective blank in column two between "Request" and "from" (step 306). The information for the second column is taken directly from the conversation name or field of FIG. 8. Next, program 16 concatenates the second NLS text string (step 308). Then, the system determines if the first NLS string is a request or acceptance (decision 310). If either is true, then the system ascertains the entry for the fourth column as the supplier label, i.e. the label of the supplier time line (step 312). If neither is true, then the system ascertains the entry for the fourth column as the customer label, i.e. the label of the customer time line (step 314). Then, program 16 concatenates the entry for the fourth column to the previous concatenation of the first NLS string, second column information and second NLS string. Thus, the complete text for the first label is now determined, and then stored in memory 14 (step 316). Steps 304–314 are repeated for each of the remaining arrows in flowgraph 41*d* (and all subsequently selected flowgraphs). Thus, the default labels for the four arrows of each flowgraph are generated and stored, and then displayed (step 320). However, it may be necessary to truncate any of the labels if they will not fit in predetermined field lengths. As noted above, the user can then edit any of the default labels by use of the cursor and keyboard. After each edition, the new label is stored in memory 14 in place of the old one (decision 322 and step 316).

Figure 11:
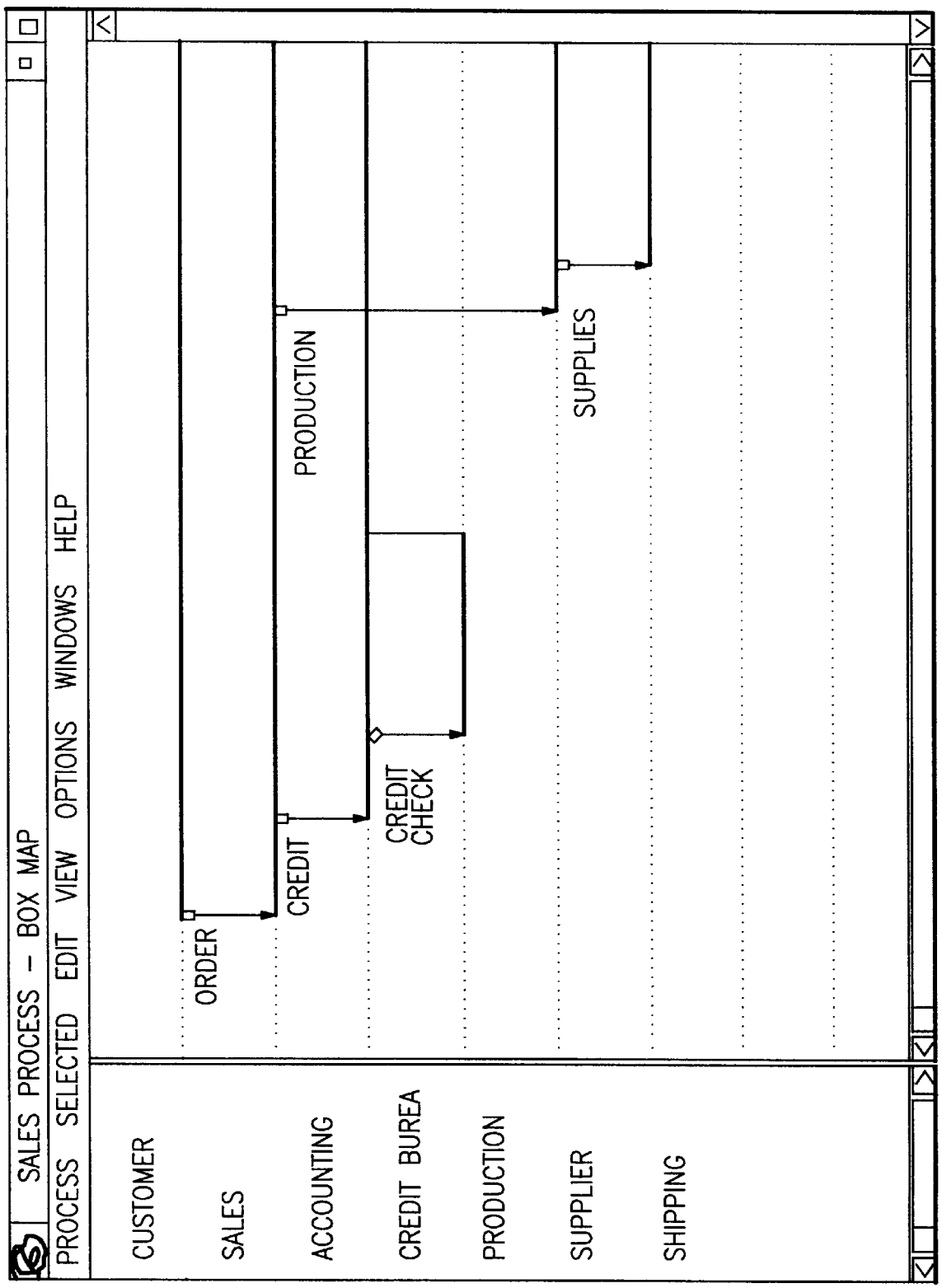
FIG. 11 illustrates a computer screen displaying a summary business workflow model corresponding to the detailed workflow model of FIG. 5.

Upon request by the user, system 10 converts the detailed workflow model of FIG. 5 to a simplified or summary workflow model of FIG. 11. In the summary model, each detailed flowgraph is represented by a beginning arrow of the flowgraph, a last arrow of the flowgraph with the arrow head removed, and solid horizontal lines interconnecting the beginning arrow and last vertical line along both time lines. Data defining the summary workflow model of FIG. 11 is also stored as a file in memory 14.

Figure 12:
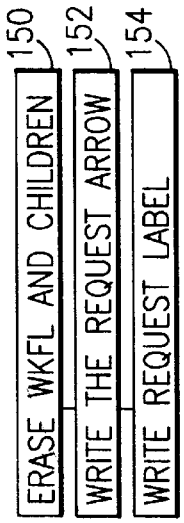
FIG. 12 is a flow chart illustrating a computer process for collapsing the flowgraphs of FIG. 5.

FIG. 12 illustrates a user selected process within program 16 for "collapsing" the detailed workflow model of FIG. 5 into an even simpler form. The user designates a flowgraph by double clicking on the first arrow of the flowgraph. In response, program 16 ceases to display the designated flowgraph and all flowgraphs that descend from the designated flowgraph (step 150). The "descendent" flowgraphs are those that stem from the designated flowgraph until return is made to the designated flowgraph. For example, the sole descendent of the credit request flowgraph of FIG. 5 is the flowgraph between the accounting and credit bureau. The descendants of the production request icon of FIG. 5 are the flowgraphs between the production and supplier departments and between the production department and shipping department (not shown) and between the production and accounting departments (also not shown). The descendants of the initial request order from the customer are all the other flowgraphs of FIG. 5. Then, program 16 displays the first arrow and label of the designated workflow (steps 152 and 154). The user can also request reversal of the process of FIG. 12 for any icon 31–34 and its descendants. In response, program 16 identifies the definition of arrows and labels for the designated icon and its descendants and displays the resultant expanded form as it appeared before it was collapsed.

The operator can request a verbal description of the responsibilities of each department that participates in the business workflow (decision 326 of FIG. 10). In response, the workflow modeling program 16 scans, from left to right, all the vertical arrows (upward and downward) that intersect the time line corresponding to the designated department. Then, program 16 identifies the flowgraph that includes the first arrow that intersects the time line and determines whether the designated department for which the operator requested the verbal description is a customer or supplier of the request represented by the arrow (decision 328). For example, for the first arrow in FIG. 5 that leads from the accounting department to the credit bureau, the accounting department is the "customer" because the accounting department makes the request for the credit check service, and the credit bureau is the "supplier" because the credit bureau supplies the credit check service. If the designated department is a customer with respect to the arrow, then program 16 determines if the arrow represents an agreement or report (decision 330). If so, then program 16 fetches an NLS text string comprising the word "Receive" in the appropriate language (step 332). Next, program 16 concatenates the respective label for this arrow after the word "Receive" (step 334) and displays the resultant verbal description of this arrow. Referring back to decision 330, if the arrow does not represent either an agreement or request, then program 16 fetches and displays the stored label as the verbal description of the arrow. Referring back to decision 328, if the department for which the operator made the request for the verbal description is not a customer but a supplier in the flowgraph of the arrow, then program 16 determines if the arrow represents a request or acceptance (decision 340). If so, program 16 fetches the "Request" NLS text string (step 342). Then program 16 concatenates the arrow label after the word "Request" (step 344) and then displays the resultant verbal description of the arrow (step 348). Then, program 16 repeats steps 328–348 for all remaining arrows, in chronological sequence, that intersect the time line of the designated department that requested the verbal description.

Figure 14:
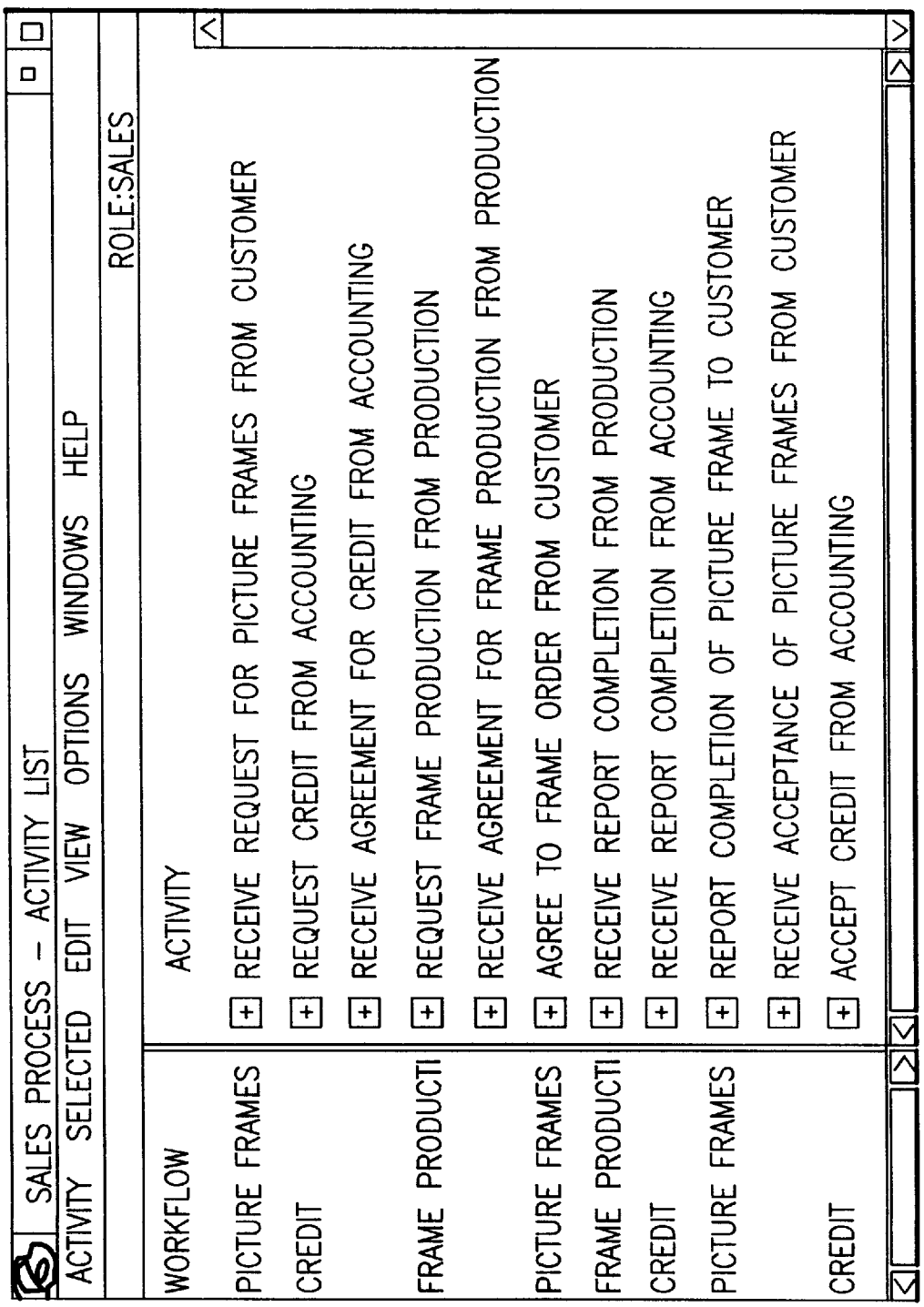
FIG. 14 illustrates a computer screen, generated by the computer of FIG. 1, displaying a verbal description of the communications involving the sales department and any other department, from the sales department's perspective, in the business workflow of FIG. 5.

FIG. 13 illustrates resultant verbal descriptions of the responsibilities of the credit department of FIG. 5 as formed by program 16. However, the operator can edit the verbal descriptions to add detail or customize. FIG. 14 illustrates resultant verbal descriptions of the responsibilities of the sales department of FIG. 5; there was editing by the operator to reflect the exact type of goods involved in the transaction.

Figure 15:
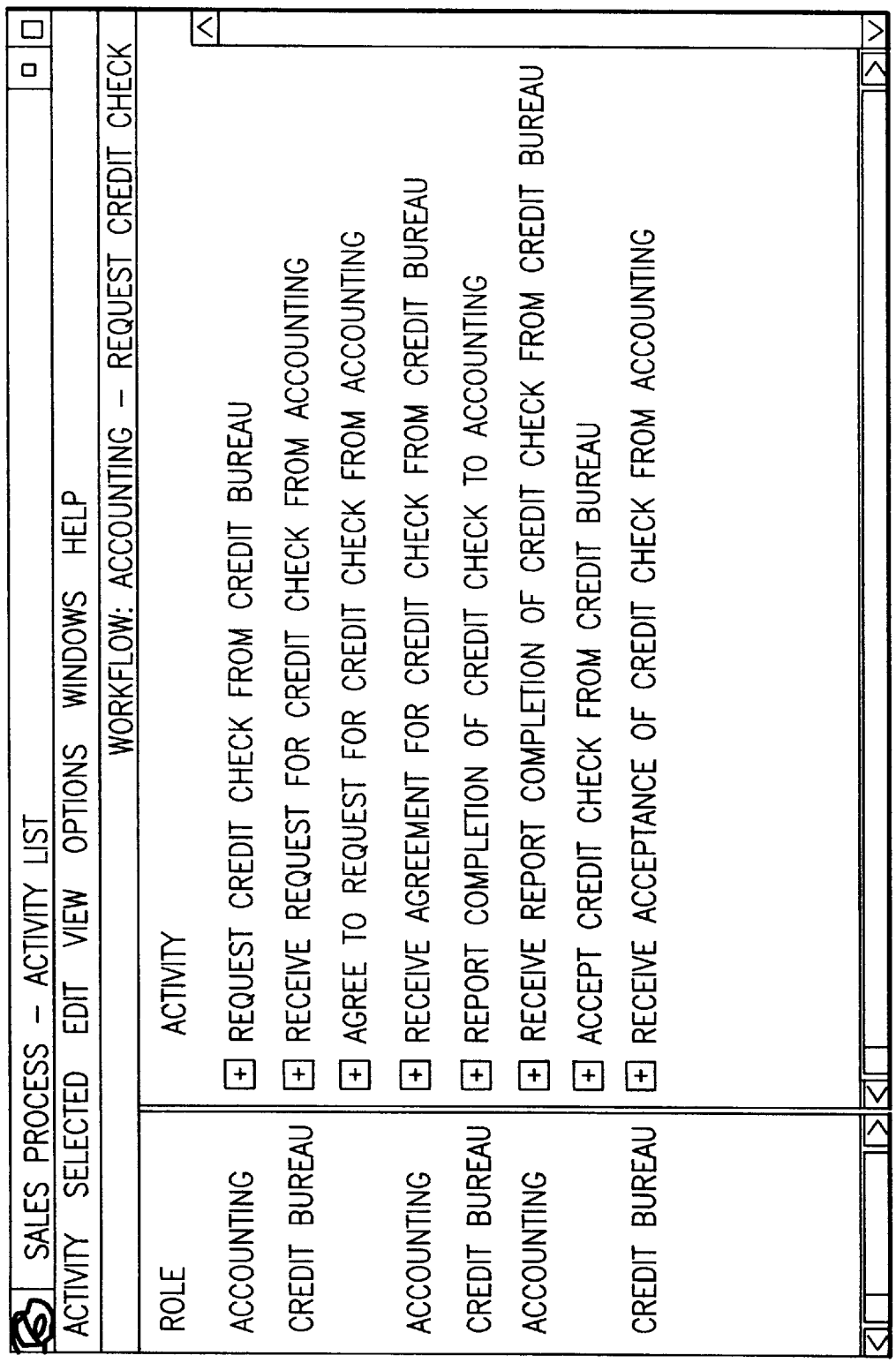
FIG. 15 illustrates a computer screen, generated by the computer of FIG. 1, displaying a verbal description of the conversation between accounting and credit departments in the business workflow of FIG. 5.

The operator can also request a verbal description of those communications represented by a single flowgraph. If so, program 16 identifies by time line label the four arrows that extend between the two departments for the designated flowgraph. Then, program 16 continues with steps 328–348 to generate and display the corresponding verbal descriptions. FIG. 15 illustrates resultant verbal descriptions of the communications between the accounting department and credit bureau; the operator did not edit any of the arrow labels.

For any item in the verbal description, the operator can define a detailed task list. For example, the operator can add to the verbal description of the first arrow for the sales to accounting flowgraph that the accounting department must review the request to ensure completeness, file one copy of the request and send another copy of the request to the accounting department.

Figure 17:
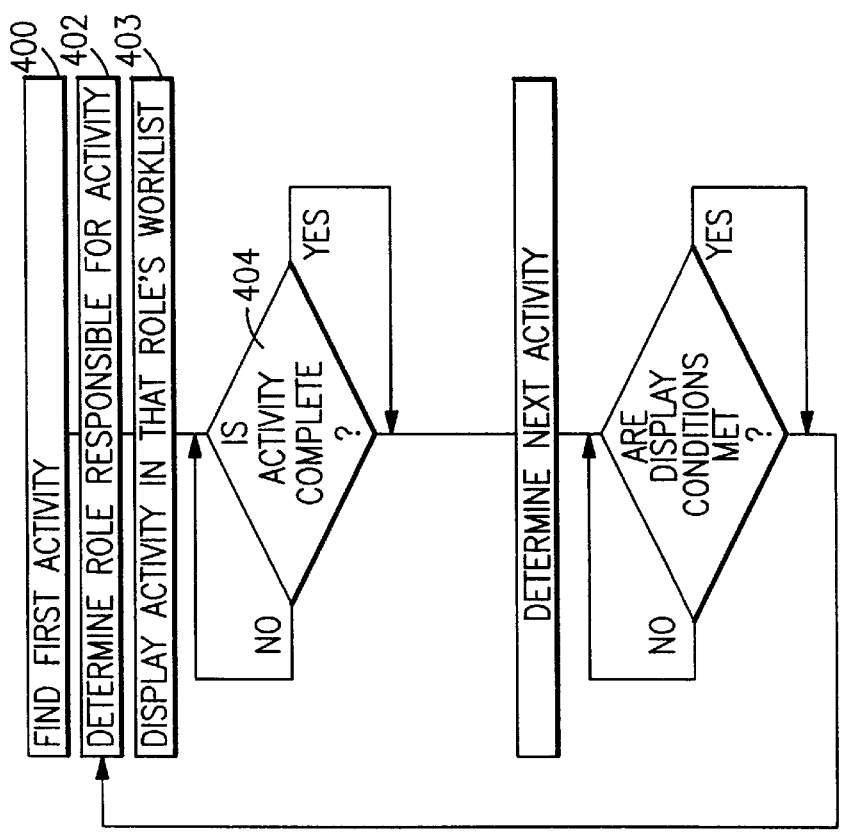
FIG. 17 illustrates a process of program 16 for determining what tasks should be displayed on each of the computers of FIG. 15.
Figure 16:
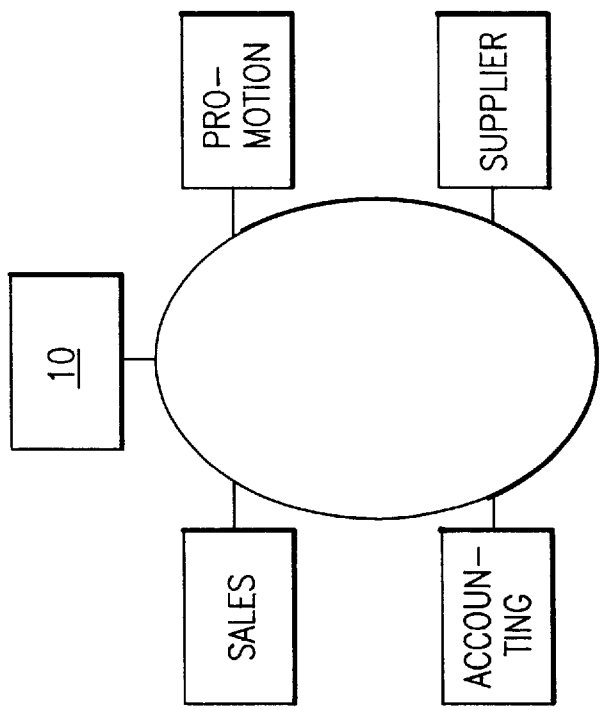
FIG. 16 illustrates a network of computers for respective participants in the workflow. The computers display immediate tasks for the respective participants to perform as directed by the computer of FIG. 1.

After the verbal descriptions of responsibilities have been defined for all departments and stored as files in computer 10, a run-time model can be provided to a personal computer 400 of each intra-company department represented on the time line. Computers 16 and 400 are all on a common network; computer 10 acts as the controller or server as illustrated in FIG. 16. Program 16 manages the run-time modules in real time and the run time modules display to these departments their immediate responsibilities, i.e. the ones that are ready and waiting for them to do next, as indicated by program 16. The portion of program 16 that determines and relays the immediate responsibilities of each intra-company department is illustrated in FIG. 17.

To begin this process, program 16 identifies the very first activity in the workflow represented by the first arrow of the highest level (step 400). In the example of FIG. 5, this is arrow 60. Next, program 16 determines from the verbal descriptions that the sales department is responsible for receiving this order (step 402). (Program 16 does not consider the customer's perspective because the customer is an external party.) Next, program 16 sends to the computer of the sales department a command to display the "receive order from customer" activity (step 403). Next, program 16 periodically checks to determine if this order has been received (decision 404). When the order is received, the sales department will log it into the sales department's computer which will then notify program 16.

Thus, program 16 will know that decision 404 has been satisfied. Other types of tasks require use of the computer, such as completing a form, and the computer automatically notifies program 16 upon completion of the task.

After the first task is completed, program 16 determines the next chronological task in the workflow (step 408). In the example of FIG. 5, the next chronological task is the credit request. Then, program 16 determines if this task should be displayed on the computers of both participants (in the example of FIG. 5, the sales and accounting departements). This determination is based on two factors—should the task be performed and have all prerequisites been satisfied (decision 410). As illustrated in FIG. 1, there are two types of requests—an unconditional request as described above and a conditional request. For example, the condition may be a dollar threshold for requesting a credit check. If the request is unconditional or is conditional and the condition is satisfied, then this first factor is satisfied. Then, program 16 determines if all the pre-requisite tasks have been completed for this next activity as follows. As noted above, program 16 generated a verbal description of each arrow in the workflow. Program 16 also lists for each of the verbal descriptions for each of the arrows, all of the tasks of the previous arrow in the hierarchy. For example, the prerequisites for the task represented by arrow 500 are those represented by arrow 503 and possibly 504, and the pre-requisites for the task represented by arrow 504 are those represented by arrow 503, etc. Thus, program 16 determines if the pre-requisites have been met by determining if all the tasks associated with the chronologically previous arrow(s) have been completed. When decision 410 has been met, program 16 determines the participant responsible for the task (step 402) and relays the task to the local computer for display (step 403). This process is repeated sequentially for each task in the workflow.

Based on the foregoing, workflow modelling systems and processes have been disclosed. However, numerous modifications and substitutions can be made without deviating from the scope of the present invention. For example, the compositions of the vertical and horizontal line segments of the flowgraphs and horizontal time lines can be changed as desired. However, preferably the horizontal line segments of each flowgraph which indicate responsibility for initiating the next communication or taking the next action are bolder or more distinct than the horizontal line segments of the flowgraph which indicate lack of responsibility for initiating the next communication or taking the next action. Also, the shape of the geometric figure that begins each flowgraph can be changed as desired. Also, the verbal descriptions of the default labels can be changed. Also, the time spacing between arrows can be adjusted to indicate an approximate time allotted to perform each task. Therefore, the invention has been disclosed by way of illustration and not limitation and reference should be made to the following claims to determine the scope of the present invention.

We claim:

1. A computer implemented method for forming a model of a workflow, said method comprising the steps of:

displaying on a computer screen a first flowgraph between two horizontal time lines representing two respective participants, said first flowgraph comprising a plurality of vertical directional line segments extending between said two horizontal time lines and representing respective communications or other actions between said participants;

receiving by the computer a selection of a second flowgraph for display between one of said two time lines and a third, horizontal time line representing a third participant, said second flowgraph comprising a plurality of vertical directional line segments extending between said one time line and said third horizontal time line and representing respective communications or other actions between the participants represented by said one and third time lines; and while displaying said first flowgraph, displaying on said computer screen said second flowgraph between said one and third time lines, whereby said first and second flowgraphs form part of the model.

2. A method as set forth in claim 1 wherein each of said flowgraphs comprises two horizontal line segments which are vertically aligned with each other and extend between two of the vertical line segments of the respective flowgraph, and one of said horizontal line segments is bolder or more distinctive than the other horizontal line segment.

3. A method as set forth in claim 2 wherein the time lines have a different character than the horizontal line segments.

4. A method as set forth in claim 2 wherein the bolder or more distinctive horizontal line segment corresponds to the participant who is obligated to initiate a next communication or next action in the workflow after the communication or other action represented by the previous vertical line segment in the same flowgraph.

5. A method as set forth in claim 4 wherein said other horizontal line segment in each pair corresponds to the other participant who is awaiting the communication or other action from the participant represented by the bolder or more distinctive horizontal line segment.

6. A method as set forth in claim 2 wherein said two horizontal line segments are aligned or nearly aligned with said two time lines, respectively, such that it is apparent which participant is represented by said horizontal line segments.

7. A method as set forth in claim 6 further comprising the computer implemented step of horizontally moving at least one vertical line segment of said first flowgraph and shortening or lengthening said horizontal line segments of said first flowgraph to interconnect to said vertical line segment.

8. A method as set forth in claim 1 wherein each of said flowgraphs comprises a first vertical arrow pointing in one direction, second and third subsequent vertical arrows pointing in the opposite direction, and a fourth subsequent vertical arrow pointing in said one direction.

9. A method as set forth in claim 8 wherein said first, second, third and fourth vertical arrows represent a request for a product or service, agreement to provide the product or service, performance and acceptance of the product or service, respectively.

10. A method as set forth in claim 1 further comprising the computer implemented step of generating default labels for each of the vertical line segments of said second flowgraph to describe a nature of the respective communication or other action.

11. A method as set forth in claim 1 wherein said one and third time lines represent a customer participant and a supplier participant and said second flowgraph comprises a first arrow pointing from the customer time line to the supplier time line and representing a request for goods or services, a subsequent arrow pointing from the supplier time line to the customer time line representing agreement to provide the goods or services, a subsequent arrow pointing from the supplier time line to the customer time line representing performance, and a subsequent arrow pointing from the customer time line to the supplier time line representing payment or acceptance of the goods or services.

12. A method as set forth in claim 1 wherein the other of said two time lines is interposed between said one time line and said third time line and further comprising the computer implemented step of lengthening a plurality of vertical line segments of said second flowgraph to extend between said one time line and said third time line.

13. A method as set forth in claim 1 wherein said step of receiving the selection of said second flowgraph comprises the steps of:
displaying on a computer screen a multiplicity of horizontal time lines for a multiplicity of respective participants in the workflow, and at least one selectable flowgraph comprising a plurality of vertical directional line segments; and
selecting said flowgraph and positioning said flowgraph between said one and third time lines such that each vertical line segment extends between said one and third time lines and represents a communication or other action.

14. A system for forming a model of a workflow, said system comprising:
means for generating and displaying on a computer screen a multiplicity of horizontal time lines for a multiplicity of respective participants in the workflow; and
means for generating and displaying a first set of directional vertical line segments between two of said time lines, and a second set of directional vertical line segments between one of said two time lines and a third line, each vertical line segment representing a communication or other action in the workflow between the two respective participants.

15. A computer implemented method for forming a model of a workflow, said method comprising the steps of:
displaying on a computer screen a first flowgraph between two parallel time lines representing two respective participants, said first flowgraph comprising a plurality of directional line segments perpendicular to and extending between said two parallel time lines and representing respective communications or other actions between said participants;
receiving by the computer a selection of a second flowgraph for display between one of said two time lines and a third, time line representing a third participant and parallel to said two time lines, said second flowgraph comprising a plurality of directional line segments perpendicular to and extending between said one time line and said third time line and representing respective communications or other actions between the participants represented by said one and third time lines; and
while displaying said first flowgraph, displaying on said computer screen said second flowgraph between said one and third time lines, whereby said first and second flowgraphs form part of the model.

16. A method as set forth in claim 15 wherein each of said flowgraphs comprises two line segments which are parallel to said time lines, aligned with each other and extend between two of said directional line segments of the respective flowgraph, and one of said two line segments is bolder or more distinctive than the other of said two line segments.

17. A method as set forth in claim 16 wherein the time lines have a different character than said two line segments.

18. A method as set forth in claim 16 wherein said one line segment corresponds to the participant who is obligated to initiate a next communication or next action in the workflow after the communication or other action represented by the previous directional line segment in the same flowgraph.

19. A method as set forth in claim 18 wherein said other line segment corresponds to the other participant who is awaiting the communication or other action from the participant represented by said one line segment.

20. A method as set forth in claim 16 wherein said two line segments are aligned or nearly aligned with said two time lines, respectively, such that it is apparent which participant is represented by said parallel line segments.

21. A method as set forth in claim 20 further comprising the computer implemented step of moving at least one of said directional line segments of said first flowgraph and shortening or lengthening said two line segments of said first flowgraph to interconnect to said one directional line segment.

22. A method as set forth in claim 15 wherein the directional lines segments of each of said flowgraphs comprises a first arrow pointing in one direction, second and third subsequent arrows pointing in the opposite direction, and a fourth subsequent arrow pointing in said one direction.

23. A method as set forth in claim 22 wherein said first, second, third and fourth arrows represent a request for a product or service, agreement to provide the product or service, performance and acceptance of the product or service, respectively.

24. A method as set forth in claim 15 further comprising the computer implemented step of generating default labels for each of said perpendicular vertical line segments of said second flowgraph to describe a nature of the respective communication or other action.

25. A method as set forth in claim 15 wherein said one and third time lines represent a customer participant and a supplier participant and said second flowgraph comprises a first arrow pointing from the customer time line to the supplier time line and representing a request for goods or services, a subsequent arrow pointing from the supplier time line to the customer time line representing agreement to provide the goods or services, a subsequent arrow pointing from the supplier time line to the customer time line representing performance, and a subsequent arrow pointing from the customer time line to the supplier time line representing payment or acceptance of the goods or services.

26. A method as set forth in claim 15 wherein said other time line is interposed between said one time line and said third time line and further comprising the computer implemented step of lengthening a plurality of directional line segments of said second flowgraph to extend between said one time line and said third time line.

27. A system for forming a model of a workflow, said system comprising:
means for generating and displaying on a computer screen indications of a multiplicity of parallel time lines for a multiplicity of respective participants in the workflow; and
means for generating and displaying a first set of directional line segments perpendicular to and between two of said time lines, and a second set of directional line segments perpendicular to and between one of said two time lines and a third line, each directional line segment representing a communication or other action in the workflow between the two respective participants.

28. A computer implemented method for forming a model of a workflow, said method comprising the steps of:

displaying on a computer screen a first flowgraph comprising a first directional line segment representing a first communication or other action from a first participant to a second participant, a second line segment perpendicular to and extending from a front end of said first directional line segment, a third directional line segment extending from said second line segment parallel to said first directional line segment and representing a second, subsequent communication or other action from said second participant to said first participant, a fourth line segment aligned with said second line segment and extending from and perpendicular to a back end of said third directional line segment, a fifth directional line segment extending from said fourth line segment parallel to said first directional line segment and representing a third, subsequent communication or other action from said second participant to said first participant, a sixth line segment parallel with said second and fourth line segments and extending from a front end of said fifth directional line segment, and a seventh directional line segment extending from said sixth line segment parallel to said first directional line segment and representing a fourth, subsequent communication or other action from said first participant to said second participant;

receiving by the computer a selection of a second flowgraph comprising an eighth directional line segment representing a fifth communication or other action from said first participant to a third participant, a ninth line segment perpendicular to and extending from a front end of said eighth directional line segment, a tenth directional line segment extending from said ninth line segment parallel to said eight directional line segment and representing a sixth, subsequent communication or other action from said third participant to said first participant, an eleventh line segment aligned with said ninth line segment and extending from and perpendicular to a back end of said tenth directional line segment, a twelfth directional line segment extending from said eleventh line segment parallel to said eight directional line segment and representing a tenth, subsequent communication or other action from said third participant to said first participant, a thirteenth line segment parallel with said ninth and eleventh line segments and extending from a front end of said twelfth directional line segment, and a fourteenth directional line segment extending from said thirteenth line segment parallel to said eighth directional line segment and representing an eleventh, subsequent communication or other action from said first participant to said third participant; and while displaying said first flowgraph, displaying on said computer screen said second flowgraph, whereby said first and second flowgraphs form part of the same model.

29. A computer program product for forming a model of a workflow, said program product comprising:

a computer readable medium;

first program instruction means for instructing a processor to display on a computer screen a first flowgraph between two parallel time lines representing two respective participants, said first flowgraph comprising a plurality of directional line segments perpendicular to and extending between said two parallel time lines and representing respective communications or other actions between said participants;

second program instruction means for instructing a processor to receive a selection of a second flowgraph for display between one of said two time lines and a third, time line representing a third participant and parallel to said two time lines, said second flowgraph comprising a plurality of directional line segments perpendicular to and extending between said one time line and said third time line and representing respective communications or other actions between the participants represented by said one and third time lines; and third program instruction means for instructing a processor, while said first flowgraph is being displayed, to display on said computer screen said second flowgraph between said one and third time lines, whereby said first and second flowgraphs form part of the model; and wherein each of said program instructions means is recorded on said medium in executable form.

* * * * *